June 23, 1970 H. E. AUSTEN 3,516,152

METHOD OF MAKING A MAGNETIC TRANSDUCER SET

Filed Feb. 2, 1968 2 Sheets-Sheet 1

INVENTOR
HERMAN E. AUSTEN
BY Louis A. Kline
John J. Callahan
HIS ATTORNEYS

June 23, 1970 H. E. AUSTEN 3,516,152

METHOD OF MAKING A MAGNETIC TRANSDUCER SET

Filed Feb. 2, 1968 2 Sheets-Sheet 2

INVENTOR
HERMAN E. AUSTEN

BY Louis A. Kline
John J. Callahan

HIS ATTORNEYS

United States Patent Office 3,516,152

Patented June 23, 1970

3,516,152
METHOD OF MAKING A MAGNETIC TRANSDUCER SET

Herman E. Austen, Trotwood, Ohio, assignor to The National Cash Register Company, Dayton, Ohio, a corporation of Maryland Filed Feb. 2, 1968, Ser. No. 702,753
Int. Cl. H01f 7/06
U.S. Cl. 29—603 6 Claims

ABSTRACT OF THE DISCLOSURE

The present invention relates to a method of making a magnetic transducer set comprising providing a series of interconnected nonmagnetic metal elements, each nonmagnetic metal element having an outer convex surface; forming a photoresist-coated precisely-defined ridge across the outer convex surface by chemical etching; electrodepositing a magnetic material layer on the outer convex surface of each nonmagnetic metal element, except for the top of the ridge of each nonmagnetic metal element; and winding a magnetic induction coil around each nonmagnetic metal element.

BACKGROUND OF THE INVENTION

U.S. Pat. No. 2,647,167, issued July 28, 1953, on the application of Michael Rettinger, discloses the fabrication of a magnetic transducer set comprising forming a series of C-shaped magnetic transducers, each C-shaped magnetic transducer composed of laminated magnetic material layers, and placing a series of U-shaped electrical conductor elements within a corresponding C-shaped magnetic transducer.

Each magnetic transducer of the magnetic transducer set of the present invention comprises electrodepositing a magnetic material layer on the outer convex surface of a nonmagnetic metal element, the magnetic material layer being separated by the photoresist on the top of a ridge across a formed nonmagnetic metal element. The Rettinger U.S. patent shows the laminating of magnetic material layers to form a C-shaped magnetic transducer, but not the electrodepositing of a magnetic material layer upon the outer convex surface of a previously-formed nonmagnetic metal element, except for the top of a ridge across the outer convex surface of the nonmagnetic metal element, to form a magnetic transducer.

U.S. Pat. No. 3,224,074, issued Dec. 21, 1965, on the application of Charles J. Peters, discloses the making of a magnetic transducer by vaporizing a series of magnetic material belts evenly spaced on the outer surface of a glass cylinder, thinly scratching the belts to form gaps, and looping a magnetic coil around each vaporized thinly scratched magnetic material belt. Each vaporized thinly scratched magnetic material belt is not a continuation of the crystal structure of the glass cylinder, because it is vaporized on the glass cylinder, rather than electrodeposited, so that peeling of the belt from the glass cylinder may occur.

In accordance with the present invention, a magnetic material layer is electrodeposited on the outer convex surface of each previously-formed nonmagnetic metal element, each magnetic material layer thereby becoming a continuation of the crystal structure of each previously-formed nonmagnetic metal element, so that peeling of the magnetic material layer from each nonmagnetic metal element is eliminated.

The method of the present invention incorporates a chemically-formed, positive photoresist-covered, precisely-defined ridge across the outer convex surface of a previously-formed nonmagnetic metal element, which ridge is utilized in producing a precisely-defined gap in subsequently electrodeposited magnetic material. The Peters U.S. patent does not use chemically-formed, positive photoresist-covered, precisely-defined ridges to produce precisely-defined gaps, but, instead, scratches magnetic material from each vaporized magnetic material belt by means of a stylus to produce gaps in the vaporized magnetic material belts.

SUMMARY OF THE INVENTION

The present invention relates to a method of making a magnetic transducer set comprising forming a precisely-defined area of photoresist across the outer convex surface of each of a series of interconnected nonmagnetic metal elements, chemically etching the exposed metal of each said surface to form a precisely-defined ridge coated with photoresist, electrodepositing a magnetic material layer on the etched metal of each said surface but not on each photoresist-coated ridge, each said ridge forming a precisely-defined gap in each magnetic material layer, and winding a magnetic induction coil around the magnetic material layer on each said surface.

DESCRIPTION OF THE PREFERRED EMBODIMENT

Figure 1:
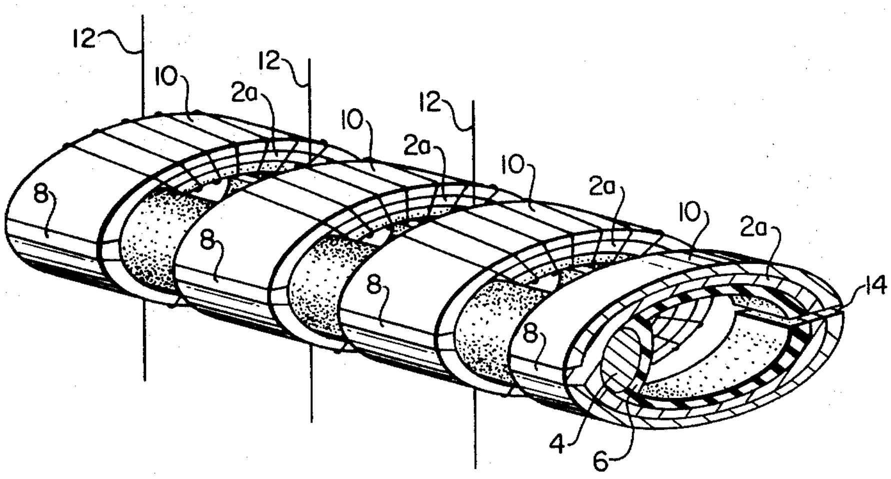
FIG. 1 is a perspective view of a completed magnetic transducer formed by the method of the first embodiment.
Figure 2:
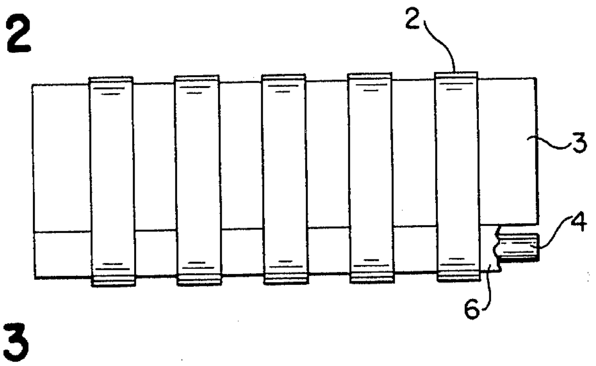
FIG. 2 is a plan view of the initial steps for the making of a magnetic transducer by the method of the first embodiment.
Figure 3:
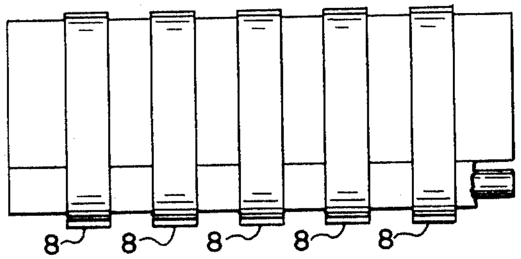
FIG. 3 is a plan view of an intermediate step for the making of a magnetic transducer by the method of the first embodiment.

The first embodiment of the method of the present invention is shown in FIGS. 1, 2, and 3. FIG. 2 shows the initial steps of the first embodiment, which is practiced by winding a strip of a nonmagnetic metal 2, such as a copper strip, the copper strip being 0.020 inch in width, in helix fashion around a combination of $\frac{1}{32}''$ x $\frac{3}{8}''$ x $1\frac{1}{2}''$ mold release coated block of nonmagnetic material 3, such as a mold release coated block of wood, and a 0.020" diameter nonmagnetic metal rod 4, such as a brass rod 4, the brass rod contacting one $\frac{1}{32}''$ x $1\frac{1}{2}''$ side of the mold release coated block of wood, the corners of the opposite $\frac{1}{32}''$ x $1\frac{1}{2}''$ side of the mold release coated block of wood being rounded, to form loops of the copper strip 2.

The copper strip 2 is wound around the combination brass rod 4 and mold release coated block of wood 3, so that the spacing between successive edges of the loops of the copper strip 2 is 0.020".

The loops of the copper strip 2 are bonded to the brass rod 4. The back surfaces of the loops of the copper strip 2 and the surface of the brass rod 4 are masked by dipping the copper strip, the brass rod, and the mold release coated block of wood into epoxy to form an epoxy coating 6 on the brass rod 4 and on the loops of the copper strip 2.

The epoxy coating is then removed from the outer surface of the loops of the copper strip 2. The epoxy coating 6 over the inner surface of the loops of the copper strip and over the surface of the brass rod 4 prevents later etching and later electrodeposition of magnetic material upon the inner surfaces of the loops of the copper strip 2 and upon the outer surface of the brass rod 4.

The partially completed magnetic transducer set is coated with positive photoresist supplied by Shipley Company, Incorporated, of Walnut Park, Wellesley, Mass., U.S.A., which coating is permitted to air dry. A mask of transparent celluloid having a photographically-produced dark line, 5/10000" in width, is so placed that the photographically-produced dark line, 5/10000" in width, is parallel to the brass rod 4, on the highly curved outer section of the outer surface of the loops of the copper strip adjacent to the brass rod 4, as a step in forming rectangular ridges 8, as seen from a plan view.

The positive photoresist is exposed to visible light, the visible light striking all of the positive photoresist except for the positive photoresist covered by the photographically-produced dark line 5/10000" in width. The exposed positive photoresist is then removed from the loops of the copper strip by a suitable solvent, provided by Shipley Company, Incorporated, for removing exposed positive photoresist, leaving 5/10000" wide rectangular areas of unexposed positive photoresist, as seen from a plan view, on the loops of the copper strip, as shown in FIG. 3.

The partially completed magnetic transducer set is dipped into $FeCl_3$, so that the loops of the copper strip, which are approximately .003 inch thick, have approximately 0.002" of copper etched from their outer surface to form 0.002-inch-high rectangular ridges 8, as seen from a plan view, on the loops of the copper strip due to the action of the unexposed photoresist.

The partially completed magnetic transducer set is dipped into a second solution, composed of 0.5 g./l. of $PdCl_2$ and 10 ml./l. of HCl for ten seconds to chemically deposit a thin film of palladium on the etched regions of the loops of the copper strip, to adequately prepare the partially completed magnetic transducer set for later electrodeposition.

The partially completed magnetic transducer set is then dipped into a third solution, composed of:

| | G./l. |
|---|---|
| $NiCl_2 \cdot 6H_2O$ | 30 |
| $NaH_2PO_2 \cdot H_2O$ | 15 |
| $NH_4Cl$ | 58 |
| Ammonium citrate | 65 |

with a pH of 8.2 and a temperature of 80 degrees centigrade, for one minute, to chemically deposit a thin film of 93% of nickel and 7% of phosphorus onto the thin film of palladium. This step further prepares the partially completed magnetic transducer set for electrodeposition.

The partially completed magnetic transducer set is then placed in a nickel-iron magnetic material plating bath, the loops of the copper strip being the cathode, a platinum plate being the anode, and the current density being 5 ma./cm$^2$. The current flows until 0.002" thick nickel-iron magnetic material layers are deposited upon the thin film of 93% nickel and 7% phosphorus on the copper strip 2. The nonmagnetic copper prevents a magnetic short circuit between the magnetic material layers 10.

The nickel-iron magnetic material plating solution is an aqueous solution having

| | G./l. |
|---|---|
| $NiSO_4 \cdot 6H_2O$ | 218 |
| $H_3BO_3$ | 40 |
| $FeCl_3$ | 3.9 |
| Sodium saccharin | 1.5 |
| Naphthalene trisulfonic acid | 1.75 |

The ratio of volume of the nickel-iron magnetic material plating solution to area of the loops of the copper strip 2 to be plated is ½ liter/cm.$^2$.

The loops of copper strip are then cut at points 14 over the longitudinal center line of the 1/32" x 1½" side of the block opposite to the brass rod 4, to form a series of nonmagnetic copper elements **2*a* attached to a brass rod 4. The unattached mold release coated block of wood is taken from beneath the series of nonmagnetic copper elements 2*a***.

Magnetic induction coils 12 are wound around the nonmagnetic copper elements 2, so as to be able to induce a magnetic current through the nickel-iron magnetic material layers 10 on the outer convex surface of the nonmagnetic copper elements 2, or to sense a flux change in the nickel-iron magnetic material layers 10 on the outer convex surface of the nonmagnetic copper elements 2, as shown in FIG. 1.

The nonmagnetic copper elements 2 are cast in an epoxy compound casing, leaving the region of the former rectangular ridges 8 of the nonmagnetic copper elements 2 at the surface of the casing.

the epoxy upon the nickel-iron magnetic material layers 10 to either side of the rectangular ridges 8 remains on the nickel-iron magnetic material layers 10 to prevent any moving magnetic tape, which magnetic tape is sensed and magnetized by the magnetic transducer set of the present invention, from wearing down the nickel-iron magnetic material layers 10.

Figure 4:
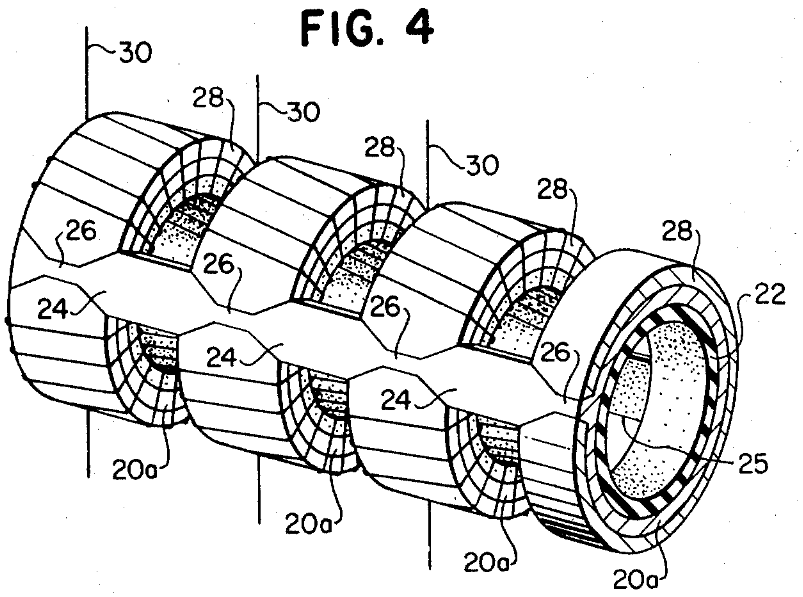
FIG. 4 is a perspective view of a completed magnetic transducer formed by the method of the second embodiment.
Figure 5:
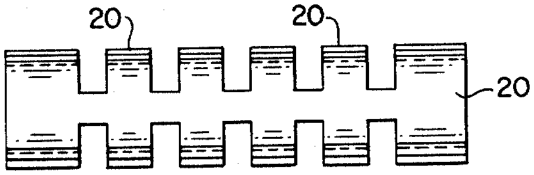
FIG. 5 is a plan view of the initial steps for the making of a magnetic transducer by the method of the second embodiment.
Figure 6:
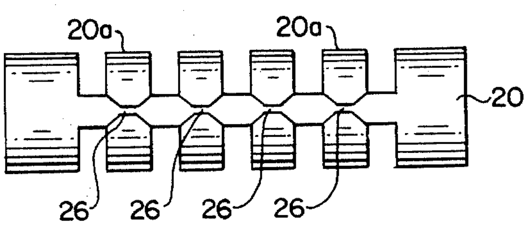
FIG. 6 is a plan view of an intermediate step for the making of a transducer by the method of the second embodiment.

The second embodiment of the method of the present invention is shown in FIGS. 4, 5, and 6. FIG. 5 shows the initial steps of the second embodiment, which is practiced by sectioning out U-shaped sections from a metal tube 20, such as a brass tube, the metal tube 20 being ⅛" in diameter, 0.015" in wall thickness, and 1½" long, by mechanical cutting, so as to form a series of interconnected 0.062-inch-wide nonmagnetic metal elements **20*a*, each having an outer convex surface, the nonmagnetic metal elements having a center-to-center spacing of 0.094", to provide the desired recording track spacing. The brass tube 20 is then coated with exoxy, to form an insulating coating 22 on the inner surfaces and the edges of the nonmagnetic metal elements 20, on the inner surfaces and the edges of the interconnections 24, and on the complete surface of the interconnections 25. The insulating coating 22** prevents later etching and electrodeposition of magnetic material on the areas covered.

The partially completed magnetic transducer set is dipped into positive photoresist supplied by Shipley Company, Incorporated, so as to cover the complete surface of the brass tube 20. The brass tube 20 is removed from the positive photoresist, and the coating of positive photoresist is permitted to air dry. A mask of transparent celluloid having a photographically-produced black repeating triangular pattern of 0.094" length, and width of 0.0005" for 0.032" of the length, width of 0.0005" to 0.060" for 0.030" of the length, and width of 0.060" for 0.032" of the length, is used. The mask is placed in contact with the positive photoresist on the interconnected nonmagnetic metal elements **20*a*, so that the center of each 0.0005-inch-wide section of the black pattern is at the center of each 0.064-inch-wide nonmagnetic metal element 20*a* along the line formed by the nonmagnetic metal elements 20*a* and by the interconnections 24**.

The unmasked positive photoresist is exposed to light from a Sylvania Sun Gun for one minute. The mask is removed, and then the exposed positive photoresist is removed with Shipley photoresist solvent, leaving a triangular area of unexposed positive photoresist, as shown in FIG. 6, on the nonmagnetic metal elements **20*a* and unexposed photoresist over the outer surface of each interconnection 24**.

The partially completed magnetic transducer set is dipped into $FeCl_3$, so that the outer exposed surface of each nonmagnetic metal element **20*a* is etched approximately 0.002", forming 0.002" high triangular ridges 26, as shown in FIG. 6, on the interconnected nonmagnetic metal elements 20***a*, due to the action of the unexposed positive photoresist. The interconnected nonmagnetic metal elements 20*a* are then dipped into the second and third solutions of embodiment number one, for ten seconds and one minute, respectively.

The partially completed magnetic transducer set is then placed in the nickel-iron magnetic material plating bath of embodiment number one until a 0.002-inch-thick nickel-iron magnetic material layer 28 is deposited upon the outer convex surface of each nonmagnetic metal element 20*a*. The nonmagnetic brass prevents magnetic short-circuiting between the magnetic material layers 28.

Magnetic induction coils 30 are wrapped around the interconnected, nickel-iron-magnetic-material-coated, nonmagnetic metal elements 20*a*, as shown in FIG. 4.

The interconnected nonmagnetic metal elements 20*a* are cast in epoxy, leaving the region of the ridges 26 at the surface of the casting. The epoxy upon the nickel-iron magnetic material layer to either side of each gap remains on the nickel-iron magnetic material layer to prevent any moving magnetic tape, which moving magnetic tape is sensed and magnetized by the magnetic transducer set of the present invention, from wearing down the nickel-iron magnetic material layers 28.

The method of the third embodiment is practiced using the steps of the first embodiment with the additional step of soldering the loops of the copper strip 2 to the brass rod 4, prior to dipping the brass rod 4, the mold release coated block of wood 3, and loops of the copper strip 2 into epoxy. The soldering of the copper strip 2 to the brass rod 4, prior to dipping into epoxy, strengthens the bond between the loops of the copper strip 2 and the brass rod 4.

The method of the fourth embodiment comprises the steps of the first embodiment, with the exception that the $FeCl_3$ etching step is omitted, so that a rectangular film of unexposed positive photoresist, as seen from a plan view, is used to divide the electrodeposited magnetic material layer, rather than the unexposed positive-photoresist-covered chemically-formed rectangular ridge of copper.

The method of the fifth embodiment comprises the steps of the second embodiment, with the exception that the $FeCl_3$ etching step is omitted, so that a triangular film of unexposed positive photoresist, as seen from a plan view, is used to divide the electrodeposited magnetic material layer, rather than the unexposed positive-photoresist-covered chemically-formed triangular ridge of brass.

The method of the sixth embodiment comprises the steps of the first embodiment, with the additional step of joining the ends of the interconnected nonmagnetic copper elements 2*a* with a high-permeability-type magnetic material, such as a Ni-Fe high-permeability-type magnetic material. The Ni-Fe high-permeability-type magnetic material lowers the reluctance through each magnetic material layer 10 of each magnetic transducer of the magnetic transducer set of the first embodiment.

What is claimed is:

1. A method of making a magnetic transducer core, comprising:

(a) forming a precisely-defined area of photoresist across a nonmagnetic metal element, said element having an outer convex surface;
(b) chemically etching the exposed metal of the outer convex surface of said element to form a precisely-defined ridge coated with photoresist;
(c) electroplating a magnetic material layer on said etched metal but not on the photoresist-coated ridge, said photoresist-coated ridge forming a precisely-defined gap in the magnetic material; and
(d) winding a magnetic induction coil around said magnetic material layer.

2. A method of forming a magnetic transducer set, comprising:

(a) forming a precisely-defined area of photoresist across the outer convex surface of each of a series of interconnected nonmagnetic metal elements;
(b) chemically etching the exposed metal of each said surface to form a precisely-defined ridge coated with photoresist;
(c) electroplating a magnetic material layer on the etched metal of each said surface, but not on each photoresist-coated ridge, each said photoresist-coated ridge forming a precisely-defined gap in each magnetic material layer; and
(d) winding a magnetic induction coil around the magnetic material layer on each said surface.

3. The method of making a magnetic transducer set comprising the steps of (a) applying a positive photoresist on a convex nonmagnetic metal surface;
(b) exposing said photoresist to light but for a thin area of photoresist which is to aid in defining a ridge;
(c) removing the exposed photoresist;
(d) chemically etching the exposed metal of each said surface to form a precisely defined ridge coated with photoresist;
(e) electroplating the etched surface of the convex curved nonmagnetic metal surface with a high-permeability magnetic material; and
(f) placing a magnetic induction winding around the high-permeability magnetic material coated convex curved nonmagnetic metal surface.

4. The method of making a multiple-turn magnetic transducer set comprising the steps of (a) applying a mold release material to a rectangular block;
(b) winding a flat copper wire around both the rectangular block of nonconductive material and a rod of conductive material positioned contiguous to one end of said block;
(c) casting an epoxy compound around the rod and the wire;
(d) cleaning the outer surface of the wire encompassing the rod;
(e) applying a positive photoresist to the outer surface of the wire;
(f) exposing the photoresist on the outer surface of the wire to light but for a line on the section of the wire tangent to the rod;
(g) removing the exposed photoresist;
(h) etching the wire, thereby leaving ridges thereon;
(i) electroplating the etched surfaces of the wire with a high-permeability magnetic material over all of its exposed surfaces;
(k) cutting the wire at the corners of the assembly opposite the head gap area so that the block can be removed, thereby forming a U-shaped core structure;
(l) removing the block from the assembly;
(m) placing magnetic induction windings upon each of the legs of the U-shaped core structure;
(n) casting the assembly in an epoxy compound; and
(o) polishing the face of the head assembly to define the transducing gap.

5. The method of claim 4 wherein the legs of each U-shaped core are closed by casting magnetic material across the ends of said legs.

6. The method of making a multiple-ring magnetic transducer set comprising the steps of (a) cutting crescent-shaped sections at equal intervals out of a brass tube to form interconnected brass rings;
(b) applying epoxy over the surfaces of the brass tube;
(c) cleaning said epoxy from the outer surface of the brass tube;
(d) applying positive photoresist to the outer surface of the brass tube;
(e) exposing said photoresist to light but for the photoresist covering the outer surfaces of the interconnections of the brass rings and a triangular area of photoresist between said interconnections;

(f) removing the exposed photoresist;

(g) etching the brass rings, thereby forming ridges on the brass rings, said ridges being covered with photoresist;

(h) electroplating the brass rings with a high-permeability magnetic material over all the exposed surfaces;

(i) placing magnetic induction windings around each brass ring;

(j) casting the assembly in an epoxy compound; and (k) polishing the faces of the multiple-ring assembly to define the transducing gap.

References Cited

UNITED STATES PATENTS

| | | | |
|---|---|---|---|
| 2,647,167 | 7/1953 | Rettinger | 179—100.2 |
| 3,222,461 | 12/1965 | Wood et al. | 179—100.2 |
| 3,224,074 | 12/1965 | Peters | 29—603 |
| 3,292,164 | 12/1966 | Wells et al. | |
| 3,407,492 | 10/1968 | Davis | 29—604 |

CHARLIE T. MOON, Primary Examiner

C. E. HALL, Assistant Examiner

U.S. Cl. X.R.

29—527.4, 625; 179—100.2; 204—15, 32